United States Patent
Guo (10) Patent No.: US 9,003,019 B1
(45) Date of Patent: Apr. 7, 2015

(54) METHODS AND SYSTEMS FOR UTILIZATION TRACKING AND NOTIFICATION OF CLOUD RESOURCES

(75) Inventor: Feng Guo, Shanghai (CN)

(73) Assignee: EMC Corporation, Hopkinton, MA (US)

( * ) Notice: Subject to any disclaimer, the term of this patent is extended or adjusted under 35 U.S.C. 154(b) by 455 days.

(21) Appl. No.: 13/249,453

(22) Filed: Sep. 30, 2011

(51) Int. Cl.
*G06F 15/173* (2006.01)
*G06Q 10/10* (2012.01)

(52) U.S. Cl.
CPC ..................... *G06Q 10/10* (2013.01)

(58) Field of Classification Search
USPC ............... 709/224, 217; 370/352; 711/171
See application file for complete search history.

(56) References Cited

U.S. PATENT DOCUMENTS

| | | | |
|---|---|---|---|
| 2003/0046396 A1* | 3/2003 | Richter et al. | 709/226 |
| 2005/0044228 A1* | 2/2005 | Birkestrand et al. | 709/226 |
| 2006/0190482 A1* | 8/2006 | Kishan et al. | 707/103 Y |
| 2006/0218557 A1* | 9/2006 | Garthwaite et al. | 718/105 |
| 2008/0104195 A1* | 5/2008 | Hawkins et al. | 709/217 |
| 2010/0027528 A1* | 2/2010 | Davidson et al. | 370/352 |
| 2010/0161827 A1* | 6/2010 | Griesmer et al. | 709/232 |
| 2010/0325206 A1* | 12/2010 | Dayal et al. | 709/204 |
| 2011/0055385 A1* | 3/2011 | Tung et al. | 709/224 |
| 2012/0124321 A1* | 5/2012 | Asano et al. | 711/171 |
| 2013/0166724 A1* | 6/2013 | Bairavasundaram et al. | 709/224 |

* cited by examiner

*Primary Examiner* — Michael C Lai
(74) *Attorney, Agent, or Firm* — Dergosits & Noah LLP; Todd A. Noah (57) ABSTRACT

Through an online process, a user in an organization may request a reservation of some of the organization's cloud computing resources. Usage of the allocated resources is monitored. If usage falls below a configurable threshold level, an alert may be generated to provide notification of inefficient resource use. The allocated resources or a portion of the allocated resources may be reclaimed so that the resource can be made available to other users in the organization.

17 Claims, 6 Drawing Sheets

METHODS AND SYSTEMS FOR UTILIZATION TRACKING AND NOTIFICATION OF CLOUD RESOURCES

BACKGROUND

The present invention relates to the field of information technology, including, more particularly, to systems and techniques for managing cloud resources of an organization.

We live in an increasingly competitive world in which global competition is highlighting the need for organizations to become more efficient at managing their resources and, in particular, their cloud computing resources. Examples of resources that may be deployed as cloud resources include storage, servers, virtual machines, memory, applications, services, and processors—just to name a few examples. Despite rapid advancements in technology, these resources are not without cost. Studies have shown that over the next few years companies are expected to spend many billions of dollars on computing resources. Unfortunately, existing techniques to manage such resources have not kept pace with resource spending. This has lead to inefficiencies and resource waste.

Thus, there is a need for systems and techniques for more efficiently managing computing resources.

DETAILED DESCRIPTION

Figure 1:
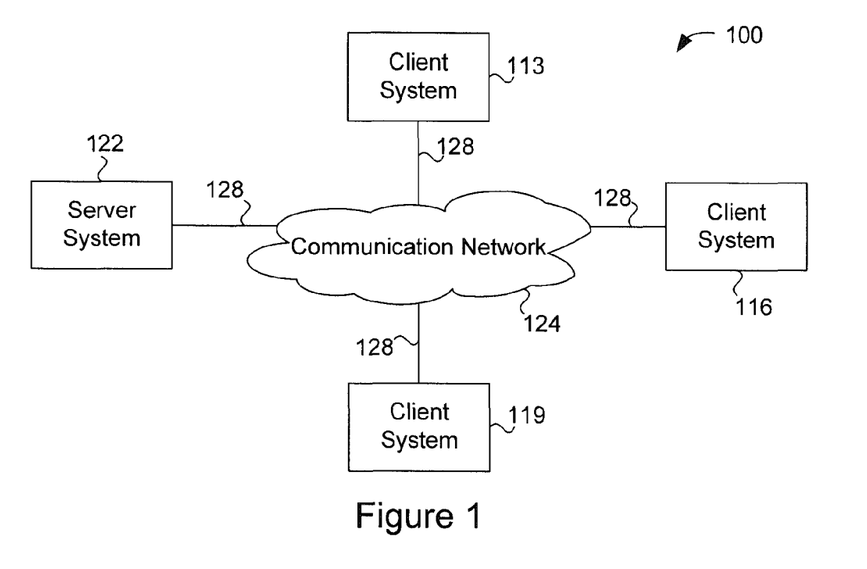
FIG. 1 shows a block diagram of a client-server system and network in which an embodiment of the invention may be implemented.

FIG. 1 is a simplified block diagram of a distributed computer network 100. Computer network 100 includes a number of client systems 113, 116, and 119, and a server system 122 coupled to a communication network 124 via a plurality of communication links 128. There may be any number of clients and servers in a system. Communication network 124 provides a mechanism for allowing the various components of distributed network 100 to communicate and exchange information with each other.

Communication network 124 may itself be comprised of many interconnected computer systems and communication links. Communication links 128 may be hardwire links, optical links, satellite or other wireless communications links, wave propagation links, or any other mechanisms for communication of information. Various communication protocols may be used to facilitate communication between the various systems shown in FIG. 1. These communication protocols may include TCP/IP, HTTP protocols, wireless application protocol (WAP), vendor-specific protocols, customized protocols, and others. While in one embodiment, communication network 124 is the Internet, in other embodiments, communication network 124 may be any suitable communication network including a local area network (LAN), a wide area network (WAN), a wireless network, a intranet, a private network, a public network, a switched network, and combinations of these, and the like.

Distributed computer network 100 in FIG. 1 is merely illustrative of an embodiment and is not intended to limit the scope of the invention as recited in the claims. One of ordinary skill in the art would recognize other variations, modifications, and alternatives. For example, more than one server system 122 may be connected to communication network 124. As another example, a number of client systems 113, 116, and 119 may be coupled to communication network 124 via an access provider (not shown) or via some other server system.

Client systems 113, 116, and 119 typically request information from a server system which provides the information. For this reason, server systems typically have more computing and storage capacity than client systems. However, a particular computer system may act as both a client or a server depending on whether the computer system is requesting or providing information. Additionally, although aspects of the invention have been described using a client-server environment, it should be apparent that the invention may also be embodied in a stand-alone computer system. Aspects of the invention may be embodied using a client-server environment or a cloud-computing environment.

Server 122 is responsible for receiving information requests from client systems 113, 116, and 119, performing processing required to satisfy the requests, and for forwarding the results corresponding to the requests back to the requesting client system. The processing required to satisfy the request may be performed by server system 122 or may alternatively be delegated to other servers connected to communication network 124.

Client systems 113, 116, and 119 enable users to access and query information stored by server system 122. In a specific embodiment, a "Web browser" application executing on a client system enables users to select, access, retrieve, or query information stored by server system 122. Examples of web browsers include the Internet Explorer browser program provided by Microsoft Corporation, and the Firefox browser provided by Mozilla Foundation, and others.

Figure 2:
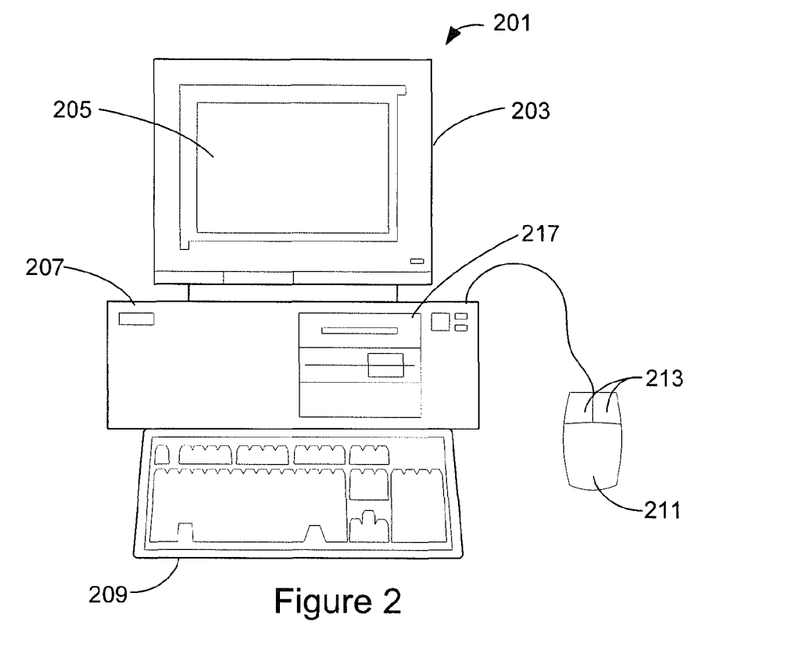
FIG. 2 shows a more detailed diagram of an exemplary client or computer which may be used in an implementation of the invention.

FIG. 2 shows an exemplary client or server system. In an embodiment, a user interfaces with the system through a computer workstation system, such as shown in FIG. 2. FIG. 2 shows a computer system 201 that includes a monitor 203, screen 205, cabinet 207, keyboard 209, and mouse 211. Mouse 211 may have one or more buttons such as mouse buttons 213. Cabinet 207 houses familiar computer components, some of which are not shown, such as a processor, memory, mass storage devices 217, and the like.

Mass storage devices 217 may include mass disk drives, floppy disks, magnetic disks, optical disks, magneto-optical disks, fixed disks, hard disks, CD-ROMs, recordable CDs, DVDs, recordable DVDs (e.g., DVD-R, DVD+R, DVD-RW, DVD+RW, HD-DVD, or Blu-ray Disc), flash and other non-volatile solid-state storage (e.g., USB flash drive), battery-backed-up volatile memory, tape storage, reader, and other similar media, and combinations of these.

A computer-implemented or computer-executable version of the invention may be embodied using, stored on, or associated with computer-readable medium or non-transitory computer-readable medium. A computer-readable medium may include any medium that participates in providing instructions to one or more processors for execution. Such a medium may take many forms including, but not limited to, nonvolatile, volatile, and transmission media. Nonvolatile media includes, for example, flash memory, or optical or magnetic disks. Volatile media includes static or dynamic memory, such as cache memory or RAM. Transmission media includes coaxial cables, copper wire, fiber optic lines, and wires arranged in a bus. Transmission media can also take the form of electromagnetic, radio frequency, acoustic, or light waves, such as those generated during radio wave and infrared data communications.

For example, a binary, machine-executable version, of the software of the present invention may be stored or reside in RAM or cache memory, or on mass storage device 217. The source code of the software may also be stored or reside on mass storage device 217 (e.g., hard disk, magnetic disk, tape, or CD-ROM). As a further example, code may be transmitted via wires, radio waves, or through a network such as the Internet.

Figure 3:
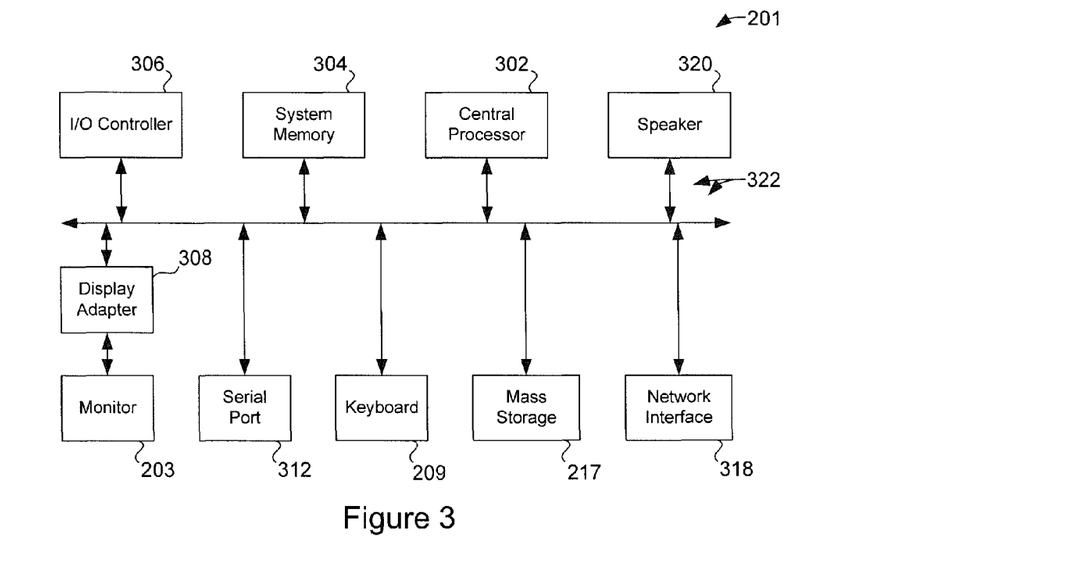
FIG. 3 shows a system block diagram of a client computer system.

FIG. 3 shows a system block diagram of computer system 201. As in FIG. 2, computer system 201 includes monitor 203, keyboard 209, and mass storage devices 217. Computer system 201 further includes subsystems such as central processor 302, system memory 304, input/output (I/O) controller 306, display adapter 308, serial or universal serial bus (USB) port 312, network interface 318, and speaker 320. In an embodiment, a computer system includes additional or fewer subsystems. For example, a computer system could include more than one processor 302 (i.e., a multiprocessor system) or a system may include a cache memory.

Arrows such as 322 represent the system bus architecture of computer system 201. However, these arrows are illustrative of any interconnection scheme serving to link the subsystems. For example, speaker 320 could be connected to the other subsystems through a port or have an internal direct connection to central processor 302. The processor may include multiple processors or a multicore processor, which may permit parallel processing of information. Computer system 201 shown in FIG. 2 is but an example of a suitable computer system. Other configurations of subsystems suitable for use will be readily apparent to one of ordinary skill in the art.

Computer software products may be written in any of various suitable programming languages, such as C, C++, C#, Pascal, Fortran, Perl, Matlab (from MathWorks), SAS, SPSS, JavaScript, AJAX, Java, SQL, and XQuery (a query language that is designed to process data from XML files or any data source that can be viewed as XML, HTML, or both). The computer software product may be an independent application with data input and data display modules. Alternatively, the computer software products may be classes that may be instantiated as distributed objects. The computer software products may also be component software such as Java Beans (from Oracle Corporation) or Enterprise Java Beans (EJB from Oracle Corporation). In a specific embodiment, the present invention provides a computer program product which stores instructions such as computer code to program a computer to perform any of the processes or techniques described.

An operating system for the system may be one of the Microsoft Windows® family of operating systems (e.g., Windows 95, 98, Me, Windows NT, Windows 2000, Windows XP, Windows XP x64 Edition, Windows Vista, Windows 7, Windows CE, Windows Mobile), Linux, HP-UX, UNIX, Sun OS, Solaris, Mac OS X, Alpha OS, AIX, IRIX32, or IRIX64. Other operating systems may be used. Microsoft Windows is a trademark of Microsoft Corporation.

Furthermore, the computer may be connected to a network and may interface to other computers using this network. The network may be an intranet, internet, or the Internet, among others. The network may be a wired network (e.g., using copper), telephone network, packet network, an optical network (e.g., using optical fiber), or a wireless network, or any combination of these. For example, data and other information may be passed between the computer and components (or steps) of the system using a wireless network using a protocol such as Wi-Fi (IEEE standards 802.11, 802.11a, 802.11b, 802.11e, 802.11g, 802.11i, and 802.11n, just to name a few examples). For example, signals from a computer may be transferred, at least in part, wirelessly to components or other computers.

In an embodiment, with a Web browser executing on a computer workstation system, a user accesses a system on the World Wide Web (WWW) through a network such as the Internet. The Web browser is used to download web pages or other content in various formats including HTML, XML, text, PDF, and postscript, and may be used to upload information to other parts of the system. The Web browser may use uniform resource identifiers (URLs) to identify resources on the Web and hypertext transfer protocol (HTTP) in transferring files on the Web.

Figure 4:
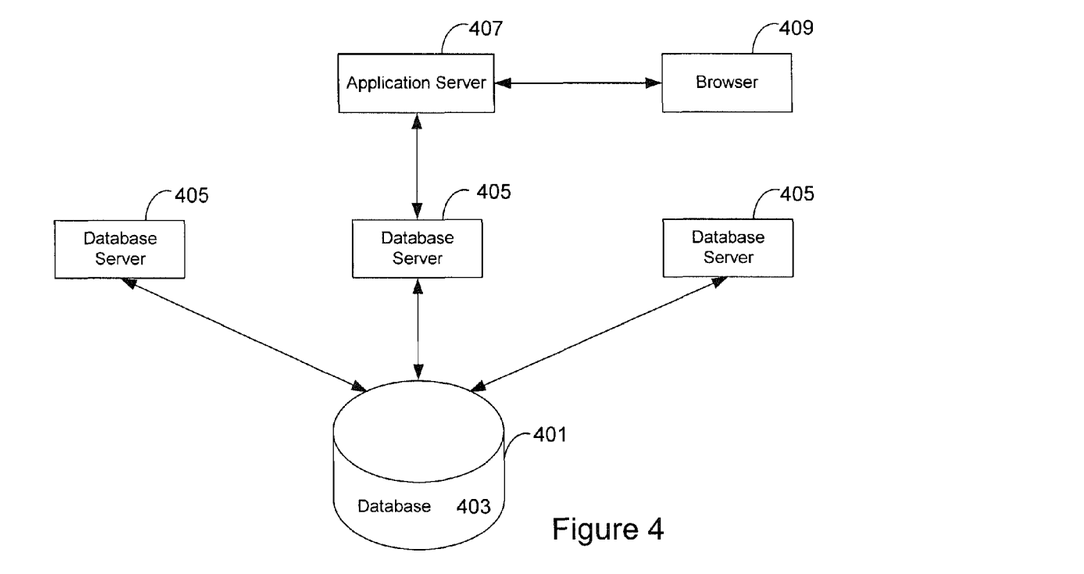
FIG. 4 shows a data source or data service in the form of a database system.

FIG. 4 shows a data source or data service in the form of a database system. A database may be part of a database management system. One suitable database management system architecture is a three-tiered architecture as shown.

In a first tier is the core of a database management system, a central storage 401 that holds or stores a database or repository 403. The database typically resides on one or more hard drives, and is generally part of a larger computer system. The information may be stored in the database in a variety of formats. An example is an Extensible Markup Language (XML) database. An XML database is a data persistence software system that allows data to be stored in XML format. Another example is a relational database management system (RDMS) which uses tables to store the information.

In a second tier are database servers 405. The database servers are instances of a program that interacts with the database. Each instance of a database server may, among other features, independently query the database and store information in the database. Depending on the implementation, the database servers 405 may or may not include user-friendly interfaces, such as graphical user interfaces.

In a third tier is an application server 407. There may be multiple application servers. In an implementation, the application server provides the user interfaces to the database servers. By way of example, the application server may be a web application server on the Internet or any other network. The application server may also be a virtual database server or a virtual directory server. The application server may provide user-friendly mechanisms and interfaces for accessing the database through the database servers. In an implementation, a web browser 409 is utilized to access the application server.

Figure 5:
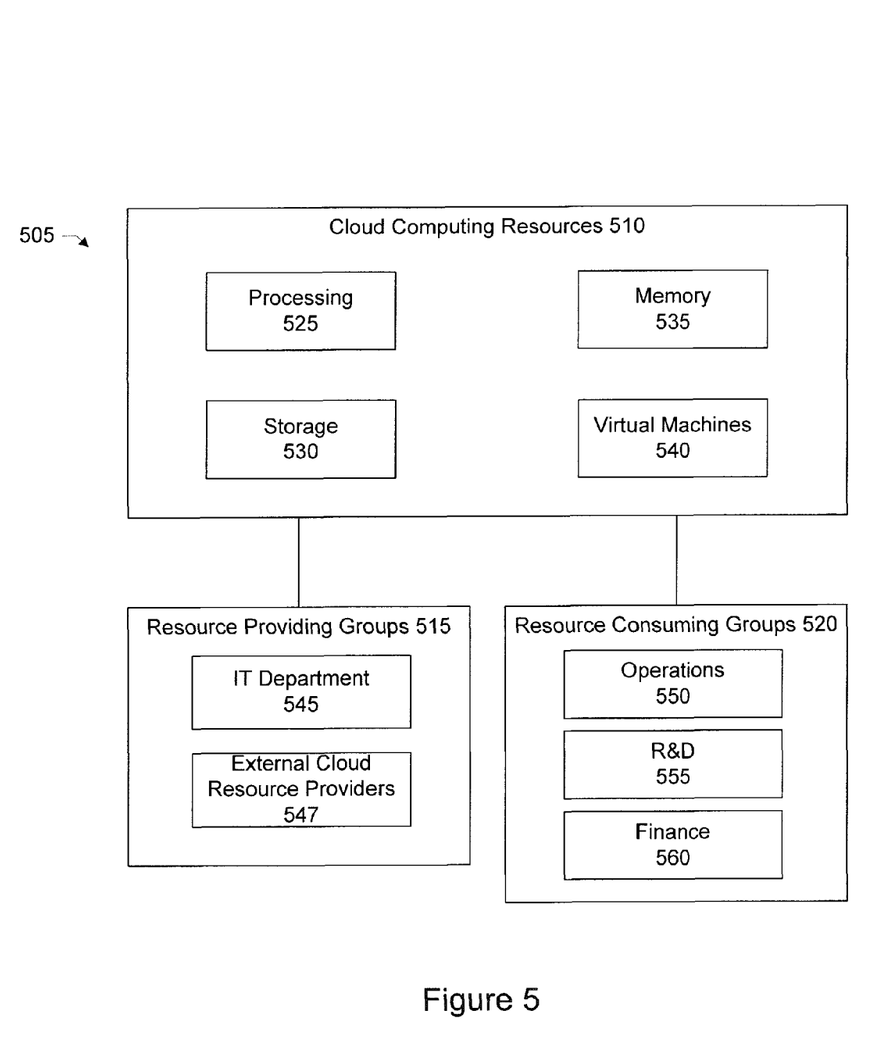
FIG. 5 shows a block diagram of cloud computing resources of an organization and the different groups that provide and use such resources.

FIG. 5 shows a block diagram in which a system of the invention may be implemented. As shown in FIG. 5, there is an organization 505 having cloud computing resources 510. The resources are managed by one or more resource providing groups 515 and are available for use by one or more resource consuming groups 520.

Cloud computing can be used to describe a delivery model for information technology (IT) services. Cloud computing can provide network access to a shared pool of computing resources which can be hardware resources, software resources, or both. More particularly, cloud computing resources can include processing 525 (e.g., CPU processing), storage 530, memory 535, and virtual machines 540. Other examples of resources include network bandwidth, services, software, or application programs—just to name a few examples.

Physical resources such as processors, storage, and memory can be combined via virtualization software to form a virtual machine (VM). A virtual machine is a software implementation of a physical machine (i.e., a computer) that executes programs like a physical machine. A virtual machine is a software abstraction of a physical computer system that is installed as a "guest" on a "host" hardware platform. In a specific implementation, a resource represents a logical object that is capable of providing to the user some IT functions, such as computing and storage. Thus, one example of a resource is a virtual machine that can provide to the user some capabilities such as computing and storage.

In the organization, such resources are typically provided or managed by an IT department 545. The IT department may be responsible for purchasing or leasing additional resources as needed, such as from external third parties 547, configuring the resources, and providing the resources to other departments in the organization such as operations 550, research and development (R&D) 555, and finance 560.

In a specific implementation, a system and technique is provided for a self-service model through which a user in a group (e.g., R&D group) requests or applies for use of IT or cloud computing resources. Some benefits of the model include standardizing the process for requesting and authorizing IT services, improved efficiency and quality of IT services, simplified user operations, and an improved user experience. In a specific implementation, a system and technique is provided for utilization notifications and a "pay for what you use" billing feature which can reduce resource waste and save the organization money.

In various specific embodiments, there is a resource rental component that supports an authorization process and enables the end-user to rent IT resources online easily, an end-user resource utilization tracking component that crosses the elastic cloud environment, a policy-based notification component to identify a potential resource as a reclaim target, and a "pay for what you use" feature to enable IT as service charge back.

In some organizations, heavy human interaction is involved in resource applying. This can be inefficient and hard to trace. Further, there is a lack of usage tracking and reclaim policy, at the end-user level which can cause resource waste. Lack of a resource charge back policy prevents IT as a service from being realistic. In other words, a user in an organization may make a request for various computing resources (e.g., virtual machines or storage). In response to the request, the IT department may set aside those resources for the user. In some cases, however, the user may make inefficient use of those resources. For example, the user may have over estimated their use or need of the resources or have may have forgotten that they have reserved those resources.

As a specific example, if the user was allocated 50 virtual machines, but instead used only 20 virtual machines, there would be a waste of resources or 30 virtual machines (i.e., 50 virtual machines allocated−20 virtual machines used=30 virtual machines). These resources, having been allocated to the user, will be sitting idle and unused when it is possible that other users in the organization may have a need for those resources. Ultimately, the entire organization may suffer because of waste and inefficiency. The problem faced by the organization may be described as the "tragedy of the commons." The tragedy of the commons is a dilemma arising from the situation in which multiple individuals, acting independently and rationally consulting their own self-interest, will ultimately deplete a shared limited resource, even when it is clear that it is not in anyone's long-term interest for this to happen. In a specific implementation, a system and technique as described in this application helps to prevent waste of shared resources (e.g., computing resources).

Figure 6:
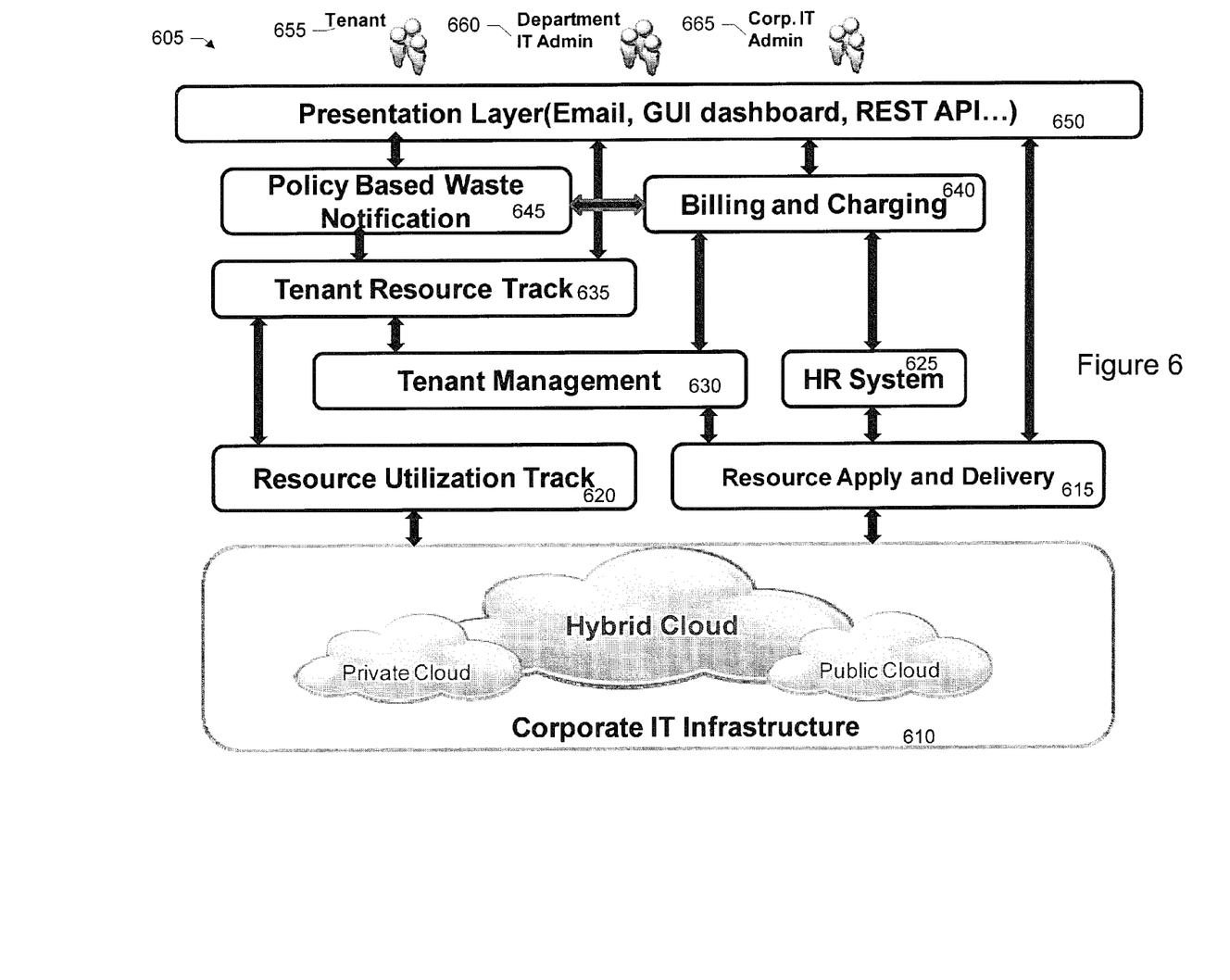
FIG. 6 shows a block diagram of components of a system for utilization tracking and notification of cloud resources.

FIG. 6 shows a block diagram of components of an IT resource rental and utilization tracking system 605. This system may include several components, subcomponents, subsystems, or modules. In a specific implementation, the system includes an infrastructure or computing resources 610, resource application and delivery 615, resource utilization tracking 620, human resources (HR) 625, tenant management 630, tenant resource tracking 635, billing and charging 640, policy-based waste notification 645, and a presentation layer 650 through which users, employees, managers, or groups such as tenants 655, department IT administrators 660, and corporate IT administrators 665 may interact with the system. Arrows between the various components indicate communications or exchanges of information between the components. In a specific implementation, these components are internal to the utilization tracking and notification of cloud resources system. In another specific implementation, one or more of the components are external to the system. For example, the system may interface, such as via an API, with an external HR system, an external billing and charging system, and so forth.

IT infrastructure 610 provides IT services for supporting the various users, groups, departments, or business units of an organization such as corporate operation, R&D, finance, etc. The IT system may be built on a hybrid cloud that leverages capabilities of both a private cloud and public cloud. A public cloud can refer to cloud infrastructure that is made available to the general public or a large industry group. The cloud infrastructure may be owned by an organization selling cloud services. A private cloud can refer to a cloud infrastructure that is operated solely for an organization. It may be managed by the organization or a third party and may exist on premise or off premise. A hybrid cloud may refer to a cloud infrastructure that is a composition or combination of two or more clouds (e.g., private or public) that remain unique entities but are bound together by standardized or proprietary technology that enables data and application portability (e.g., cloud bursting for load balancing between clouds). Specifically, the IT infrastructure may include computing resources such as that shown in FIG. 5 and described in the discussion above accompanying FIG. 5.

Resource application and delivery 615 includes an IT application by which an employee can apply for IT resources (e.g., computing or cloud computing resources). The application includes a configurable authentication process or a configurable approval process workflow to authorize use of the resources. For example, a process for an employee to apply for or request a resource such as a virtual machine may include: 1) Employee initializes a resource to apply for an application. 2) The employee's manager is asked to approve. 3) The department IT administrator checks the available resources and delivers resource.

Thus, in a specific implementation, an employee requests computing resources by completing an application or request. Based on a configurable workflow approval process, the system forwards the request to the employee's manager or supervisor. For example, resource application and delivery 615 may exchange information with HR 625 to identify the employee's manager. Upon approval, the system forwards the request to an IT administrator. The IT administrator can use the system to check whether or not the resource is available for the employee. If the resource is available, the IT administrator can use the system to allocate the resource to the employee such as indicating that the resource has been assigned or reserved for the employee.

Resource utilization tracking 620 collects the utilization data from the IT infrastructure (e.g., corporate IT infrastructure) for the resources. In a specific implementation, the data is used to calculate one or more utility ratios, such as a utility ratio of CPU utilization, of storage utilization, or both. In a specific implementation, resource utilization tracking 620 can monitor usage of the allocated resource and calculate metrics to measure how efficiently the allocated resources are being used.

HR system 625 maintains the employment hierarchy of the corporation, such as employee A belongs to department B and employee A's manager is employee C. Tenant management 630 manages an inventory for recording the resource allocation information. By this system, people can be aware of who is occupying what resources. Tenant resource tracking 635 provides a utilization summary of resources that were allocated to a tenant. Billing and charging 640 may be based on a "pay for resources" charging strategy. The system can charge a tenant by the allocated resources.

Policy-based waste notification 645 enables people (e.g., users, employees, or managers) to receive notification when there may be waste of a resource or some potential waste happened. The notification may be based on configurable trigger policy. For example a department manager will receive an email from the system when the utility ratio of some resource is lower than a threshold in his department. The notification may show an amount of money the wasted resource cost. Presentation layer 650 provides techniques for interacting with end user, for example email delivery, a GUI application, and any program interfaces.

Figure 7:
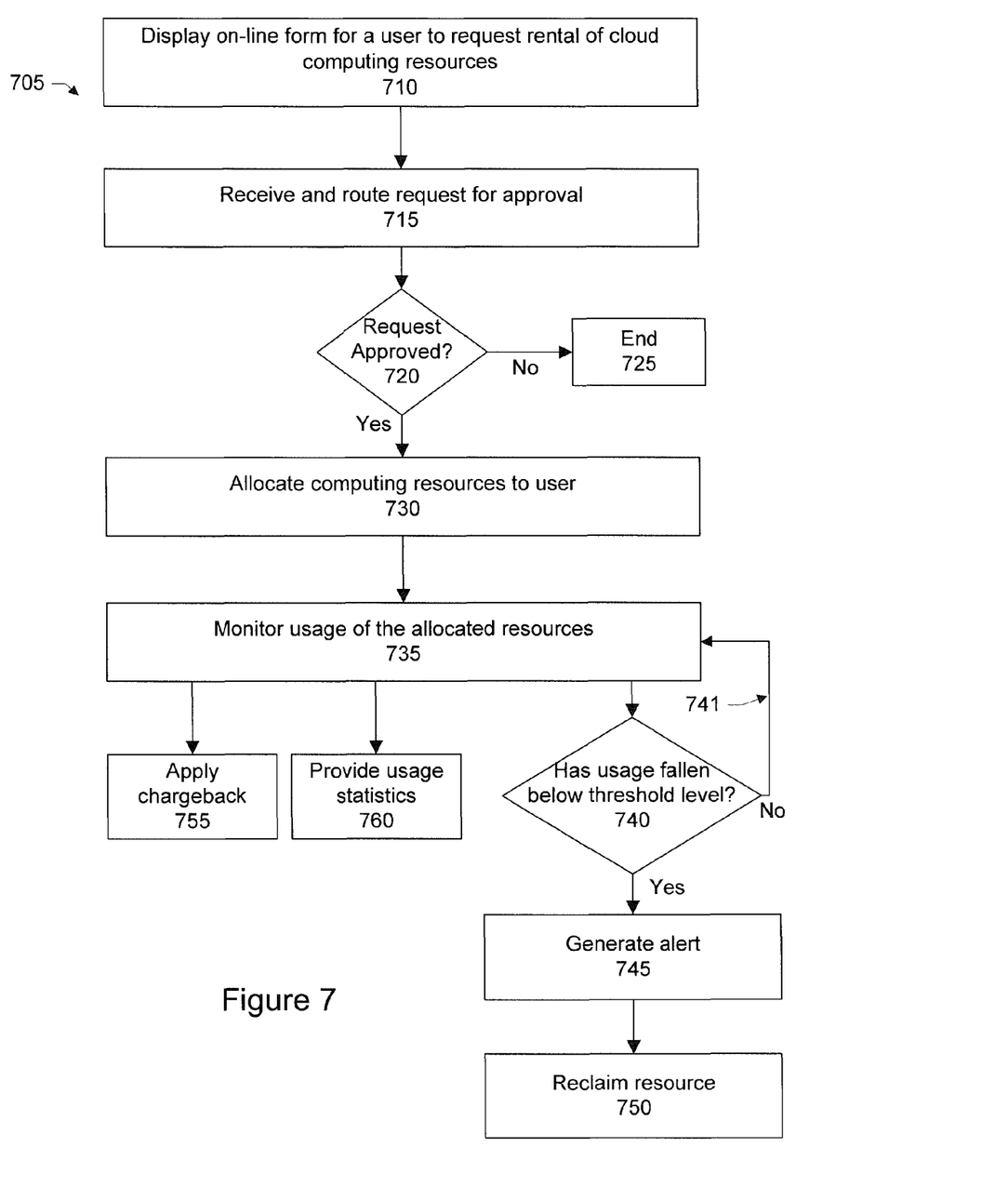
FIG. 7 shows a flow for utilization tracking and notification of cloud resources.

FIG. 7 shows an overall flow diagram 705 for resource rental and utilization tracking. Some specific flows are presented in this application, but it should be understood that the process is not limited to the specific flows and steps presented. For example, a flow may have additional steps (not necessarily described in this application), different steps which replace some of the steps presented, fewer steps or a subset of the steps presented, or steps in a different order than presented, or any combination of these. Further, the steps in other implementations may not be exactly the same as the steps presented and may be modified or altered as appropriate for a particular process, application or based on the data.

In brief, in a step 710, the system displays an online form or Web page for a user to request rental of computing resources. The request is received and routed for approval (step 715). If the request is approved (step 720), computing resources are allocated to the user (step 730). In a step 735, the system monitors usage of the resource. In a step 755, the system may apply a chargeback of the resources. In a step 760, the system provides usage statistics. In a step 740, the system determines whether usage of the resource has fallen below a threshold level. If usage has fallen below the threshold level, the system generates an alert (step 745), reclaims the resource (step 750), or both.

Referring now to step 710, an online form or Web page is displayed to the user through presentation layer 650 (FIG. 6) of the system so that the user can make a resource request. The form may include any number of various sections and input boxes for the user to input information. There can be a header section, a resource rental detail section, and a submit button. The header section may include input boxes or fields for the user's name, contact information (e.g., phone number, or e-mail address), location (e.g., building number, or office location), department (e.g., R&D), supervisor, and so forth. Some of the information may be pre-populated. For example, there may be a login or authentication process where the user enters a username and password. Based on the username, HR system 625 (FIG. 6) may be consulted to determine the user's department, supervisor, and so forth.

The resource detail section allows the user to specify the resources to rent. For example, there can be input fields to request a certain number of virtual machines, an amount of storage capacity, memory, processing units or time or CPU capacity or cycles, specific instances, specific configurations, bandwidth or network bandwidth (e.g., 10 Gigabit Ethernet), platform type (e.g., 32-bit versus 64-bit platform), an amount of data transfer (e.g., 1 million input and outputs), and the like.

In a specific implementation, the resource detail section includes a field to specify a time, time period, or duration during which the user expects to use the resources. For example, the user may request a reservation of 50 virtual machines for the period beginning Oct. 7, 2011 to Mar. 7, 2012; 750 gigabytes of storage for the period beginning Sep. 9, 2011 to Apr. 15, 2012; and so forth. In another specific implementation, a user is not required to specify a reservation time period or the time period may be open-ended. For example, the user may request 75 virtual machines for an indefinite period of time. It should be appreciated that the resource request form may include various GUI controls such as dropdown lists, radio buttons, text boxes, buttons, check boxes, and the like.

Upon completing the resource request form, the user can click a submit button to submit the request to the system. In step 715, the system receives and routes the request for approval. For example, HR system 625 may be consulted to identify the user's manager or supervisor. The system then routes the request to the user's supervisor for approval. Upon approval, the approved request may be forwarded to the IT administrator. It should be appreciated that this is merely one example of an approval process. There can be multiple levels of approval and multiple people who participate in the approval process. For example, if a large amount of resources is requested, multiple people such as directors, vice presidents, and so forth may be involved in the approval process. In an embodiment, there is a workflow builder tool that allows an administrator user to specify the approval workflow process. This allows the approval process to be user-configurable to suit the specific procedures of the organization.

In step 730, computing resources are allocated to the user. The amount of allocated computing resources may be the same or different from what the user requested. For example, if the user requested 50 virtual machines, but the IT department is unable to provide 50 virtual machines then the user may be allocated a reduced amount of resources (e.g., 40 virtual machines). Resource application and delivery 615 provides an interface through which an IT administrator can allocate or reserve a portion of the computing resources to the requesting user.

For example, through the system the IT administrator can indicate that 50 virtual machines have been allocated to user A for a particular time period. That is, the administrator may associate the virtual machines with user A for the particular time period. The 50 virtual machines are thus indicated as having been reserved for user A for the particular time period so that they will be unavailable for other users, but available for user A. Alternatively, in another specific implementation, the system can automatically make the associations based on an approved resource rental request.

In a specific implementation, the system maintains a record, such as stored in a database, that includes an identification of the user, the portion of computing resources allocated to the user, and a time period for which the portion of computing resources have been reserved. A record may be referred to as a reservation. Table A below shows an example of such a record.

TABLE A

| User | Allocated Resources | Time Period |
| --- | --- | --- |
| Madeleine | 60 virtual machines | Oct. 7, 2010-Apr. 1, 2011 |
| Leah | 500 gigabytes | Oct. 30, 2010-Jun. 7, 2011 |

In step 735, the system monitors usage of the allocated resources. Such monitoring can allow the system to apply a chargeback (step 755), provide usage statistics (step 760), determine whether usage has fallen below a threshold level (step 740), or combinations of these. Depending on the type of resource, monitoring may include analyzing used and available disk space or virtual machines, detecting whether or not a virtual machine has been powered on, determining a number of times a virtual machine has been powered on, detecting whether or not a datastore has been accessed, determining a number of times a datastore has been accessed, measuring the amount of outgoing bandwidth, amount of incoming bandwidth, processing time, the number of requests (e.g., HTTP and HTTPS requests), database calls, and so forth.

A chargeback (step 755) is an accounting technique that applies the costs of computing resources (e.g., services, hardware, or software) to the business unit that requested the resources. A chargeback helps to identify which departments, individuals, or both are responsible for the expenses. This can encourage departments and individuals to make efficient use of resources and in turn can lead to greater profitability of the organization. In a specific implementation, the chargeback is based on a "pay for what you use" policy. For example, if the user used 30 virtual machines, the user (or the user's department) would be charged for 30 virtual machines.

In another specific implementation, the chargeback is based on a "pay for what you reserved" policy. In this specific implementation, the user is charged for the resources that the user reserved, even if the user did not use all of the reserved resources. For example, if the user reserved 50 virtual machines, but used 30 virtual machines, the user would be charged for the 50 virtual machines. In another specific implementation, the chargeback is based on a "pay for what you reserved, but did not use" policy. In other words, in this specific implementation, users are not charged for what they used. Rather, in this specific implementation, they are charged for what they did not use. These techniques can be used to help promote the efficient use of resources. Users are encouraged to carefully consider their resource needs because there may be consequences for unused resources. In step 760, the system provides usage statistics such as via a dashboard. Some examples of usage statistics include amount of storage used, number of virtual machines used, and so forth.

In step 740, the system analyzes usage of the allocated resources to determine whether usage has fallen below a threshold or resource utilization level. As shown by a loop 741, the system may continuously monitor usage of the resource throughout the resource reservation period, continuously monitor usage of the resource throughout a portion of the resource reservation period, or make regular periodic or random checks of resource usage during the resource reservation period. If the usage has fallen below the threshold level, the system generates an alert (step 745), reclaims the resource (step 750), or both. Usage of a resource that falls below the threshold level may indicate that an allocated resource is not being used efficiently. Thus, the resource may be reclaimed, a portion of the resource may be reclaimed, a duration of time that the resource is reserved for may be reduced or shortened, or combinations of these so that the resource can be made available for other users.

Figure 8:
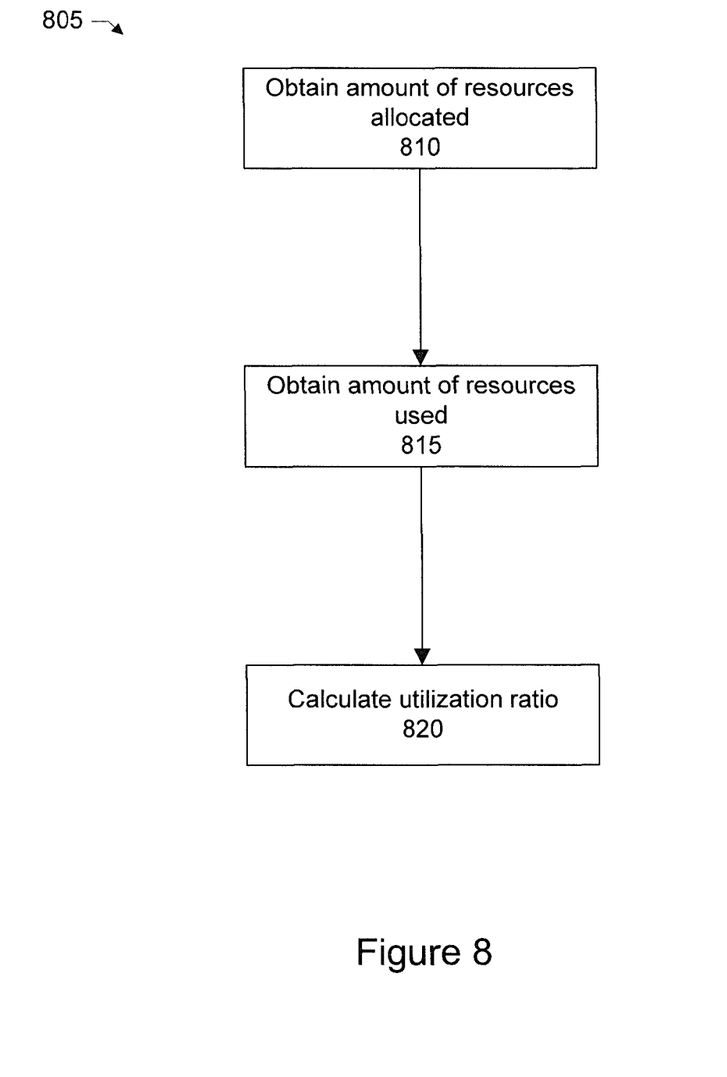
FIG. 8 shows a flow for calculating a resource utilization ratio.

In a specific embodiment, the threshold level is user-configurable. The threshold-level may be implemented as a user-configurable policy. An organization may mandate a certain level of resource utilization when resources are allocated to or reserved for use by various departments. Referring now to FIG. 8, there is a flow 805 for calculating resource utilization. In a step 810, the system obtains an amount of resources allocated (or reserved) for the user. In a step 815, the system obtains an amount of resources used by the user. In a step 820, the system calculates a ratio based on the amount of resources allocated and the amount of resources used. The ratio may be referred to as a utilization ratio. In a specific implementation, resource utilization is calculated as a ratio of resources used to resources allocated. In another specific implementation, resource utilization is calculated as a ratio of resources allocated to resources used.

It should be appreciated, however, that any computation (and not necessarily a ratio) may be used to provide an index indicating how efficiently a resource is being used. Such a computation may involve addition, subtraction, division, multiplication, or combinations of these. A computation may include values corresponding to an amount of resources allocated, an amount of resources used, an amount of resource not used, or combinations of these. A resource usage calculation may include a statistical measurement such as an average, arithmetic mean, weighted mean, median, mode, standard deviation, range, or combinations of these.

For example, an organization may have a policy of 80 percent resource utilization. If a user reserves 500 gigabytes of storage, but uses only 250 gigabytes, this would result in a utilization ratio of 50 percent (i.e., 250 gigabytes:500 gigabytes=50 percent). Thus, in this example, the system would determine that usage of the allocated resources has fallen below the threshold level of 80 percent. As another example, a user reserves 100 virtual machines, but uses only 70 virtual machines, this would result in a utilization ratio of 70 percent (i.e., 70 virtual machines:100 virtual machines=70 percent).

Depending upon the resource being measured, there can be different threshold levels. This allows the organization flexibility in setting resource utilization policy requirements depending on the type resource. Usage of a first resource type may be measured against a first threshold. Usage of a second resource type, different from the first resource type, may be measured against a second threshold. The first and second thresholds may be the same or different.

For example, the first resource type may be storage and the organization may set a policy that there be 80 percent utilization of allocated storage. The second resource type may be virtual machines and the organization may set a policy that there be 70 percent utilization of allocated virtual machines. Having different utilization thresholds based on resource type can reflect the different costs of different resource types. For example, if a first type of resource is more expensive than a second type of resource, the organization may impose a higher utilization requirement for the first type of resource than the second type of resource to reflect the added costs of the more expensive resource (i.e., first type of resource). This can help encourage users to be especially aware and carefully estimate their needs when reserving a specific type of resource.

In a specific implementation, the system determines whether resource utilization is under a threshold for a period of time, and if so, generates an alert. In a specific implementation, there is a sampling time period that overlaps with a resource reservation time period or a time period during which the allocated resource is intended to be used. During the sampling time period, the system periodically samples or calculates a set of usage values indicating usage of the resource. For example, a first usage value indicates usage of the resource at a first time during the sampling time period. A second usage value indicates usage of the resource at a second time during the sampling time period. A third usage value indicates usage of the resource at a third time during the sampling time period, and so forth. The sampling may be performed randomly or at regular times. In this specific implementation, if a number of times a usage value falls below a threshold value exceeds a threshold number of times, the system generates an alert. The sampling time period may be a rolling time period. In this specific implementation, an alert is generated if a usage value falls below a threshold usage value more than a threshold number of times in a rolling time period.

In a specific implementation, the system makes a prediction of the amount of resources expected to be used, and compares the prediction with the allocated amount of resources or a percentage of the allocated amount. If the prediction is less than the allocated amount or less than a percentage of the allocated amount, the system generates an alert. The prediction may be based on factors such as a resource usage rate. For example, if based on a current resource usage rate the user is unlikely to use all of their allocated resource, the amount of allocated resource may be reduced, a time period for which the resource has been reserved may be reduced, or both. A prediction may instead or additionally be based on a user profile history indicating whether or not the user tends to over or under estimate their use of resources. Thus, in a specific implementation, threshold levels may be user-based or calculated dynamically to account for differences in how individual users tend to estimate their use of resources. A prediction may be calculated using inferential statistics and may include hypothesis testing, estimation, correlation, extrapolation, interpolation, modeling (e.g., regression analysis), or combinations of these.

In step 745, the system may generate an alert or notification to indicate that usage has fallen below a threshold level. The alert may include an e-mail, text message, phone call, instant message, dashboard notification, or combinations of these. In a specific implementation, the system transmits the alert to the user's manager or department manager. However, the workflow for sending an alert can be configurable so that an alert may instead or additionally be sent to the user, an IT administrator, or both. In a specific implementation, the alert is not generated if usage is above the threshold level. Not generating the alert can help to prevent, for example, the IT administrator from becoming bombarded with notifications. Alternatively, in another specific implementation, the alert is generated if usage is above the threshold level. Generating such an alert can provide confirmation that the resource is being efficiently used.

In a specific implementation, the alert includes an indication of the amount of money the wasted resource cost. Such an alert helps to encourage efficient use of a resource. An alert may include a currency amount (e.g., a dollar figure) representing the difference between a first value corresponding to an amount associated with complete use of the resource and a second value corresponding to an amount associated with actual or predicted use of the resource. An alert may instead or additionally include the utilization ratio.

In a specific implementation, an alert is transmitted to the user. In this specific implementation, the alert includes a question asking whether or not the user still needs the resource. The user may be able indicate their response to the question and transmit the response back to the system. Based on the response, the system may or may not reclaim the resource or a portion of the resource. For example, if the user indicates they still need the resource, the system may not reclaim the resource. If the user indicates they no longer need the resource, the system may reclaim the resource.

In various implementations discussed above, the system determines whether usage falls below a threshold level such as whether usage is less than the threshold level, or less than or equal to the threshold level. In other specific implementations, however, the system may determine whether lack of usage or non-usage rises above a threshold level. When lack of usage or non-usage rises above the threshold level, the system may send an alert, reclaim the resource, or both.

In step 750, a resource that is being inefficiently used may be reclaimed so that the resource can be made available for other users. For example, a virtual machine that has not been powered-on for several weeks may be reclaimed so that the virtual machine can be made available for another user. As another example, a datastore where only 10 percent is being used may be reclaimed so that the datastore or a portion of the datastore can be made available for another user.

In a specific implementation, reclaiming a resource includes reducing an amount of a resource allocated or reserved to a user. In a specific implementation, the resource is reduced to an amount equal or about equal to a threshold utilization ratio. Consider, as an example, that an organization has a policy specifying a threshold utilization ratio of 80 percent for virtual machines (VMs), a user is allocated 60 VMs, but the user uses only 20 VMs. Thus, 40 VMs are unused (i.e., 60 VMs allocated−20 VMs used=40 VMs unused). For example, the system may determine that each of the 40 VMs may not have been powered on during a time period in which the machines were intended to be used by the user (e.g., marked as reserved for the user). Thus, the actual or the user's utilization ratio is about 33 percent (i.e., 20 VMs used:60 VMs allocated=33 percent). In this example, the number of VMs allocated to the user would be reduced to 48 (i.e., 48 VMs:60 VMs=80 percent utilization ratio). Thus, 12 VMs (i.e., 60 VMs−48 VMs=12 VMs) may be freed up or otherwise made available for other users.

In other words, there can be a first amount of a resource allocated to a user. A determination is made that the resource is being inefficiently used (e.g., usage has fallen below a threshold level—step 740). A method may include reducing the first amount of the resource to a second amount, less than the first amount. In a specific implementation, the second amount corresponds to the threshold level. As another example, a resource may include virtual machines where U virtual machines have been allocated to the user. The system can determine that V virtual machines are not being used. For example, each of the V virtual machines may not have been powered on during a time period in which the virtual machines were intended to be used by the user (e.g., marked as reserved for the user). Thus, Y virtual machines are being used (Y=U−V). In a specific implementation, the number of VMs allocated to the user is reduced to a number W. In a specific implementation, W is a number greater than Y and less than U. In another specific implementation, W is equal to Y.

As another example, a resource may include storage where 500 gigabytes have been allocated to a user, but the user is using only 100 gigabytes of storage. Thus, the user's utilization ratio is 20 percent (i.e., 100 gigabytes:500 gigabytes=20 percent). A policy of the organization specifies a threshold utilization ratio of 70 percent for storage. The amount of storage allocated to the user may be reduced to 350 gigabytes to achieve 70 percent utilization (i.e., 70 percent*500 gigabytes=350 gigabytes). Thus, 150 gigabytes (i.e., 500 gigabytes−350 gigabytes=150 gigabytes) may be freed up or otherwise made available for other users.

More particularly, when a resource is reclaimed, the system can update the stored resource reservation records to indicate the new resource allocations. Table B below shows an example of a resource reservation record from Table A having been updated as a result of reclaiming a resource.

TABLE B

| User | Allocated Resources | Time Period |
| --- | --- | --- |
| Madeleine | 48 virtual machines | Oct. 7, 2010-Apr. 1, 2011 |
| Leah | 350 gigabytes | Oct. 30, 2010-Jun. 7, 2011 |

In another specific implementation, reclaiming a resource includes reducing an amount of time for which the resource has been allocated to a user. For example, a resource may have been allocated to a user for the user to use during a first time period. The system determines that usage of the resource has fallen below a threshold level. A duration of the first time period is reduced to a second time period. That is, a duration of the second time period is less than a duration of the first time period. An ending date of the second time period is before an ending date of the first time period. Upon expiration of the second time period, the resource is made available for other users. In another specific implementation, reclaiming a resource includes reducing an amount of time for which the resource has been allocated to a user, and reducing an amount of the resource allocated to the user.

In a specific implementation, an IT resource rental and tracking system is provided for handling resource requests in a standard and automatic way and tracking the resource utilization for intelligent data analysis. In this specific implementation, the system components include (1) process management of IT resource application authorization; (2) an automatic IT resource delivery component; (3) an IT resource utilization dashboard; and (4) a notification system.

For (1), an authorization process may include (a) Employee fills out an application online. Through the online application, the employee may specify details such as resource, rental period, and so forth; (b) Department manager approves; (c) Lab manager approves. For (2), the system can automatically assign a proper IT resource based on the employee's resource requirements. For (3), via this dashboard, the IT administrator can have a clear overview about how many resources are occupied by a user, department, or business unit as well as resource utilization. For (4), when a rental is near to close (i.e., a rental period is about to begin), the system can notify the renter (e.g., employee), administrator, or both. When the system finds that a resource utilization is under a threshold for a period of time, the system can notify the administer, employee, or both. A notification to the employee may include a question to ask the employee whether or not he or she still needs the resource.

Some benefits of such a system can include (1) Providing a standard and automatic process to address resource requests. Simplifying operations for the resource requester and IT administrator and making resource tracking possible; (2) Reducing waste and saving investment of IT infrastructure; and (3) Providing a pay for utilization solution to enable IT as a service charge system in a company's private cloud environment. In a specific implementation, resource usage and tracking details are provided to a central management console which may further include an application execution map. Such features are further described in U.S. patent application Ser. Nos. 13/247,505 and 13/245,390 which are incorporated by reference along with all other references cited in this application.

In a specific implementation, a service enables an end-user to rent IT resources in a self-service way and supports authorization process control. This service may track resource delivery by human input, an automatic way, or both so that a cloud administrator (e.g., private cloud administrator) can know who is occupying which resource. With the relationship between the end-user and cloud resource and the mapping relation between cloud resource and physical resource, which may be provided by a map component, there can be an end-to-end view about the end-user's occupancy of a physical resource in the cloud or private cloud environment. In a specific implementation, there is an integration of services e.g., VMware vSphere Web Services SDK to monitor the resources utilization statistic. There can be delivery of an end-user's resource utilization statistic via mashuping the utilization statistic and the end-user's occupancy of resources. This statistic can be used as evidence for identifying resource waste and enabling the pay-for-what-you-use billing system.

In a specific embodiment, there is a focus on resource utilization tracking from tenant's point of view. That is, resources can be associated with people. For example, in some cases an IT administrator of a department may know the current status of resources allocated to his department, but he may not know the current status of resources allocated to a tenant of department. By generating a utilization report periodically, this solution gives users a chance to reevaluate their real IT needs.

In a specific embodiment, a feature includes potential waste identification. Through this policy-based notification, people can identify the potential resource waste easier. For example, there may be many IT resources are "sleeping" or not being efficiently used on the user side. However, the IT department may not be aware of such inefficient use and may purchase additional IT equipments. Through the notification, the tenant, IT department, or both can release the over-applied resource and reduce IT cost promptly. Further, corporate IT administrators can identify the potential waste, then take some necessary actions.

In another specific embodiment, a feature provides cost awareness. This solution helps the user keep in mind that IT resources are not without cost. The user, or the user's department, has to pay for what they applied. By doing this, the user will be encouraged to use the IT resource very carefully and use what they actually need. In this specific embodiment, the user is shown the cost when user applies for a resource, for example, $10=Gold VM/month. Cost may be shown on a periodically generated report, for example, the department spent $1000 for 50 VMs and 1 terabyte (TB) of storage this month. The unnecessary cost may be shown on the notification, for example, the utility ratio of a Gold VM is only 20 percent, so that department wasted $8 per month. By showing the number on a report, notification, or both people may have a direct feel about the cost they spent on a resource.

Although a specific embodiment of the system is directed to cloud computing resources or the information technology industry generally, the system is also applicable to any type of shared resource where it is desirable to help prevent resource waste. Aspects of the system may be applied to healthcare, manufacturing, financial services, government, and many others.

In the description above and throughout, numerous specific details are set forth in order to provide a thorough understanding of an embodiment of this disclosure. It will be evident, however, to one of ordinary skill in the art, that an embodiment may be practiced without these specific details. In other instances, well-known structures and devices are shown in block diagram form to facilitate explanation. The description of the preferred embodiments is not intended to limit the scope of the claims appended hereto. Further, in the methods disclosed herein, various steps are disclosed illustrating some of the functions of an embodiment. These steps are merely examples, and are not meant to be limiting in any way. Other steps and functions may be contemplated without departing from this disclosure or the scope of an embodiment.

What is claimed is:

1. A method for managing cloud computing resources of an organization, the method comprising:
   maintaining a record identifying a time period and a portion of the cloud computing resources as being allocated to a user of the organization, the portion of the cloud computing resources to be used by the user throughout the time period;
   monitoring, during the time period, usage of the portion of the cloud computing resources allocated to the user; and
   if the usage falls below a threshold level, generating an alert and reducing the portion and the time period of the cloud computing resources allocated to the user to an amount equal to the threshold level.

2. The method of claim 1 comprising:
   if the usage is above the threshold level, generating no alert.

3. The method of claim 1 wherein the user belongs to a group of the organization and the method comprises:
   applying a chargeback to the group based on the portion of the cloud computing resources allocated to the user.

4. The method of claim 1 wherein the alert comprises a difference between the portion of the cloud computing resources allocated to the user and a portion of the cloud computing resources used by the user.

5. The method of claim 1 wherein the alert comprises a utilization ratio of a first value to a second value, wherein the first value corresponds to a portion of the cloud computing resources used by the user, and the second value corresponds to the portion of the cloud computing resources allocated to the user.

6. The method of claim 1 further comprising receiving an online request from the user for reservation of the cloud computing resources.

7. A computer program product, comprising a non-transitory computer-readable medium having a computer-readable program code embodied therein, the computer-readable program code adapted to be executed by one or more processors to implement a method for managing cloud computing resources of an organization, the method comprising:
   maintaining a record identifying a time period and a portion of the cloud computing resources as being allocated to a user of the organization, the portion of the cloud computing resources to be used by the user throughout the time period;
   monitoring, during the time period, usage of the portion of the cloud computing resources allocated to the user; and
   if the usage falls below a threshold level, generating an alert and reducing the portion and the time period of the cloud computing resources allocated to the user to an amount equal to the threshold level.

8. The computer program product of claim 7 wherein the method comprises:
   if the usage is above the threshold level, generating no alert.

9. The computer program product of claim 7 wherein the user belongs to a group of the organization and the method comprises:
   applying a chargeback to the group based on the portion of the cloud computing resources allocated to the user.

10. The computer program product of claim 7 wherein the alert comprises a difference between the portion of the cloud computing resources allocated to the user and a portion of the cloud computing resources used by the user.

11. The computer program product of claim 7 wherein the alert comprises a utilization ratio of a first value to a second value, wherein the first value corresponds to a portion of the cloud computing resources used by the user, and the second value corresponds to the portion of the cloud computing resources allocated to the user.

12. The computer program product of claim 7 wherein the method further comprises receiving an online request from the user for reservation of the cloud computing resources.

13. A system for managing cloud computing resources of an organization, the system comprising:
   a processor; and
   a processor-based database management system coupled to the processor and executed on a computer system and configured to:
      maintain a record identifying a time period and a portion of the cloud computing resources as being allocated to a user of the organization, the portion of the cloud computing resources to be used by the user throughout the time period;
      monitor, during the time period, usage of the portion of the cloud computing resources allocated to the user; and
      if the usage falls below a threshold level, generate an alert and reduce the portion and the time period of the cloud computing resources allocated to the user to an amount equal to the threshold level.

14. The system of claim 13 wherein the processor-based database management system is configured to:
   if the usage is above the threshold level, generate no alert.

15. The system of claim 13 wherein the user belongs to a group of the organization and the processor-based database management system is configured to:
   apply a chargeback to the group based on the portion of the cloud computing resources allocated to the user.

16. The system of claim 13 wherein the alert comprises a difference between the portion of the cloud computing resources allocated to the user and a portion of the cloud computing resources used by the user.

17. The system of claim 13 wherein the alert comprises a utilization ratio of a first value to a second value, wherein the first value corresponds to a portion of the cloud computing resources used by the user, and the second value corresponds to the portion of the cloud computing resources allocated to the user.

* * * * *